Sept. 30, 1924.
A. J. BOLD
1,510,033
FLOODGATE
Filed June 25, 1923
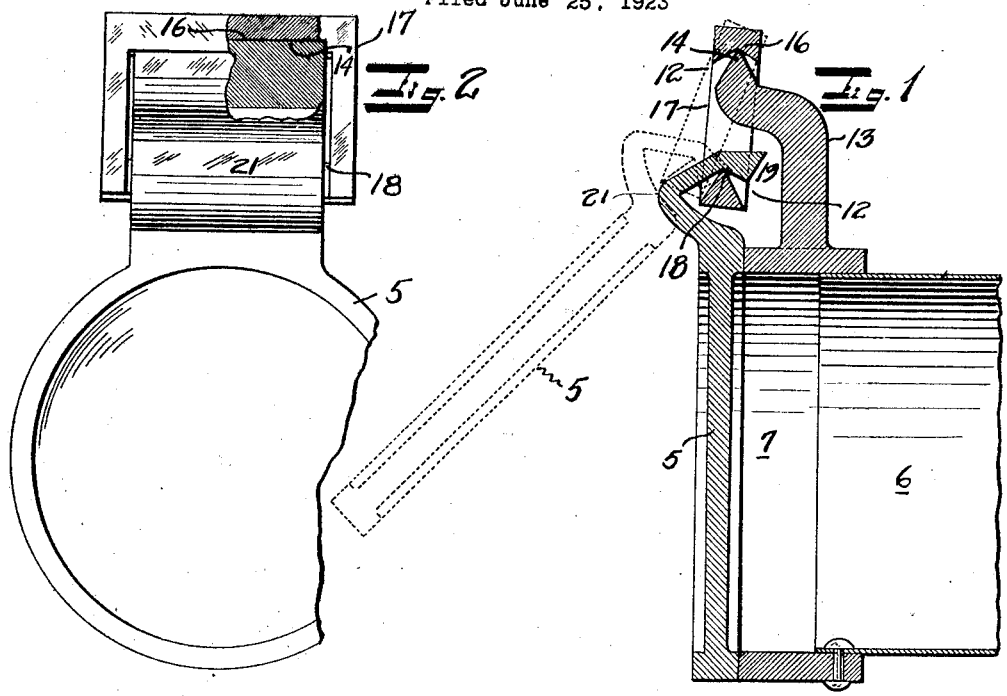
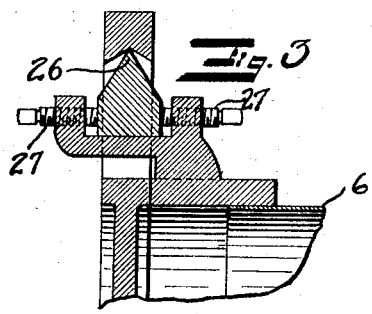
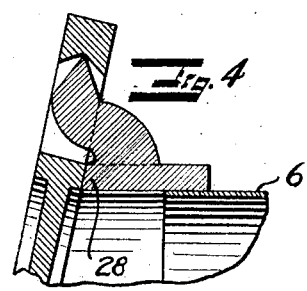
INVENTOR.
ALBERT J. BOLD
BY Joseph B. Gardner
his ATTORNEY.

Patented Sept. 30, 1924.

1,510,033

UNITED STATES PATENT OFFICE.

ALBERT J. BOLD, OF OAKLAND, CALIFORNIA.

FLOODGATE.

Application filed June 25, 1923. Serial No. 647,561.

*To all whom it may concern:*

Be it known that I, ALBERT J. BOLD, a citizen of the United States, and a resident of Oakland, county of Alameda, and State of California, have invented a new and useful Floodgate, of which the following is a specification.

My invention relates to automatically operating gates or valves generally used on the outlet end of a drainage conduit which extends into a body of water subject to flood or tide.

An object of the invention is to provide an automatically operated flood gate in which the gate is suspended in such manner as to minimize the bearing friction involved in the motion thereof, thus increasing the sensitiveness of the device and rendering its automatic operation more positive.

Another object of my invention is to provide a flood gate having the foregoing advantages in which foreign matter is prevented from accumulating in the gate bearings and impairing the operation of the gate.

A further object of my invention is to provide a flood gate in which the gate bearings are extremely simple in construction and comprise a minimum number of parts.

My invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to said drawings:

Figure 1 is a longitudinal sectional view of a flood gate equipped in accordance with my invention.

Figure 2 is a front view of the structure shown in Figure 1, a part thereof being shown broken away.

Figure 3 is a fragmentary section of a modified form of the invention.

Figure 4 is a fragmentary section of another modified form of the invention.

As is well known the efficiency of flood gates depends to a great extent on their sensitiveness or response to slight variations in the pressure of water. The gates are usually mounted to swing on ordinary hinge or pivot bolts engaging in suitable lugs formed on the gate and gate support. However this form of pivot involves considerable friction and consequently detracts from the sensitiveness of the operation of the gate. To eliminate the friction, many types of comparatively non-friction pivots have been tried, but these latter pivots have generally been of such design and character that they would in a short time, be rendered almost useless. This is occasioned by the fact that the gates frequently operate in marshy and boggy lands and the dirt and mud accumulate or work into the pivot bearings. In accordance however with my invention, I mount the gate so as to swing on a knife-edge pivot. This pivot involves a minimum friction and is so designed that neither the mud or dirt can collect thereon and impair the operation of the gate. There is thus produced a gate pivot which will permit of maximum sensitiveness and at the same time insures the continued efficient operation of the gate under difficult conditions.

A detailed description follows:—

As here illustrated the gate 5 is associated with a culvert or conduit 6 and is adapted to seat against the seat member 7 suitably attached to the end 8 of the conduit.

The gate is adapted to swing about a horizontal axis to and from the seat, and in accordance with the present invention such movement is permitted by mounting the gate on one or more knife-edge pivots 12. In the embodiment shown in Figures 1 and 2, the mounting for the gate is such that the gate will automatically assume its proper seat, and for this reason the said structure includes two knife-edge pivots. It is obvious however that this automatically adjusting feature may be dispensed with, and in its stead may be used a single pivot more or less similar to that shown in Figures 3 and 4. Referring again to Figures 1 and 2 the seat member is formed with an upwardly extending arm 13 having a horizontal knife-edge 14 extending transversely of the axis of the culvert. Engaging the edge 14 is a bearing 16 preferably in the shape of an inverted V. The bearing 16 is formed in a link 17 and is positioned opposite a knife-edge 18 also formed in the link and engaged by an inverted V-shaped bearing 19 formed in an extension 21 of the gate. When the pressure at the inner side of the gate is less than that at the outside the gate will be held in the position indicated in full lines in Figure 1, however when the water flows from the culvert, the gate will move toward the position indicated by the dotted line.

It will be noted that the gate, regardless of its position, invariably remains suspended on the sharp single line of the bearings, thereby enabling it to swing without entailing any appreciable friction. Furthermore it will be noted that the sides of both the knives and bearings all slope downwardly and outwardly thus making it practically impossible for dirt and mud to lodge between the bearing points.

It should be noted that the mounting structure of the gate is very simple in construction, notwithstanding its many advantages. As a matter of fact the structure shown in Figures 1 and 2 requires but one loose part—the link 17—which part may be readily made in one piece.

In Figure 3, I have shown a slightly modified form of the invention. In this embodiment the link 17 is omitted. Also the knife-edge 26 is movable and its position may be regulated by means of opposed screws 27 to insure proper seating of the gate.

In the embodiment shown in Figure 4, the knife-edge pivot mounting is shown in connecting with a gate seat 28 which is slightly inclined to the vertical. With this construction the gate is held in closed position more positively.

While I have shown and described the pivot bearings as being V-shaped, it is obvious that they may be flat or curved if desirable.

I claim:

1. A flood gate comprising, the combination with a conduit, a gate seat member carried by said conduit, a gate adapted to seat on said member, and a knife edge and cooperating bearing member pivotally connecting said seat member and gate adjacent their upper edge.

2. A flood gate comprising, in combination with a conduit, a gate seat member carried by said conduit, a gate adapted to seat on said member, a gate supporting member, and a link having knife-edge pivot connections with said gate and supporting member.

3. A flood gate comprising a gate seat member, a gate adapted to seat on said member, a gate supporting member, a link, engaging means between said link and support including a knife-edge bearing, and engaging means between said link and gate including a knife-edge bearing.

4. A flood gate comprising a gate seat member, a gate adapted to seat on said member, gate supporting means including a link, an upwardly extending knife-edge on said supporting member, an inverted V-bearing formed in said link and engaging said knife-edge, a knife-edge in said link opposite said V-bearing, and an inverted V-bearing formed on said gate and engaging said latter knife-edge.

5. A flood gate comprising a gate seat member, a gate adapted to seat on said member, and means including an adjustably mounted knife-edge bearing for supporting said gate to swing to and from said seat.

6. A flood gate comprising, in combination with a conduit, a gate seat member carried by said conduit, a gate adapted to seat on said member, a supporting member, and cooperating gate supporting means including an upwardly extending knife-edge carried by said supporting member and an inverted V-bearing on said gate.

7. A flood gate comprising a gate, a gate supporting member, a closed one-piece loop link pivotally and removably carried by said member, and a hook-like extension on said gate engaging said link.

In testimony whereof, I have hereunto set my hand at Oakland, this 23 day of May, 1923.

ALBERT J. BOLD.